(12) United States Patent
Aoki et al.

(10) Patent No.: US 8,673,204 B2
(45) Date of Patent: Mar. 18, 2014

(54) LARGE RETURNABLE CONTAINER, METHOD AND APPARATUS FOR MOLDING THE SAME, AND BLOW MOLD WITH SEPARATE HEATING ZONES

(75) Inventors: Daiichi Aoki, Nagano (JP); Hiroyuki Tsukamoto, Nagano-Ken (JP)

(73) Assignee: Nissei ASB Machine Co., Ltd., Nagano (JP)

( * ) Notice: Subject to any disclaimer, the term of this patent is extended or adjusted under 35 U.S.C. 154(b) by 0 days.

(21) Appl. No.: 13/371,022

(22) Filed: Feb. 10, 2012

(65) Prior Publication Data
US 2012/0132608 A1 May 31, 2012

Related U.S. Application Data

(63) Continuation of application No. PCT/JP2010/062806, filed on Jul. 29, 2010.

(30) Foreign Application Priority Data

Aug. 11, 2009 (JP) ................................. 2009-186785

(51) Int. Cl.
*B29C 49/64* (2006.01)
(52) U.S. Cl.
USPC .......................................... 264/519; 264/529
(58) Field of Classification Search
None
See application file for complete search history.

(56) References Cited

U.S. PATENT DOCUMENTS

| 4,836,971 A | 6/1989 | Denis et al. |
| 4,871,507 A | 10/1989 | Ajmera |
| 5,411,698 A | 5/1995 | Mero et al. |
| 5,419,866 A * | 5/1995 | Valyi .............................. 264/521 |
| 5,975,880 A | 11/1999 | Takada et al. |
| 6,080,353 A | 6/2000 | Tsuchiya |
| 6,344,166 B1 * | 2/2002 | Aoki et al. ..................... 264/521 |
| 6,451,243 B1 | 9/2002 | Takada et al. |
| 6,910,596 B2 * | 6/2005 | Herckner ....................... 215/398 |

FOREIGN PATENT DOCUMENTS

| CN | 1128699 | 8/1996 |
| CN | 1132683 A | 10/1996 |
| CN | 1191797 A | 9/1998 |
| JP | 63-087219 A | 4/1988 |
| JP | S6387219 A | 4/1988 |
| JP | 06-297552 A | 10/1994 |
| JP | A-8-164557 | 6/1996 |
| JP | A-2006-117289 | 6/1996 |
| JP | A-10-286874 | 10/1998 |
| JP | A-11-34152 | 2/1999 |
| JP | H1134152 A | 2/1999 |
| JP | 3777204 B2 | 3/2006 |
| WO | WO 94/06617 A1 | 3/1994 |

* cited by examiner

*Primary Examiner* — Monica Huson
(74) *Attorney, Agent, or Firm* — David L. Hoffman; Hoffman Patent Group

(57) ABSTRACT

A method of molding a large returnable container includes a heat treatment step for subjecting a thick preform formed of a polyester resin or a primary blow-molded article to intermediate blow molding with heating to obtain an intermediate molded article, and a final blow molding step that includes subjecting the intermediate molded article that has shrunk to final blow molding with heating to obtain a large returnable container. The heat treatment step includes disposing the preform or the primary blow-molded article in a heat treatment mold, and pressurizing the preform or the primary blow-molded article so that a shoulder and a body obtained by blow molding close contact to a cavity surface of the heat treatment mold, and are subjected to a heat treatment, the shoulder being heated at a low temperature as compared with the body.

14 Claims, 10 Drawing Sheets

US 8,673,204 B2

LARGE RETURNABLE CONTAINER, METHOD AND APPARATUS FOR MOLDING THE SAME, AND BLOW MOLD WITH SEPARATE HEATING ZONES

CROSS REFERENCE TO RELATED APPLICATION

This application is a continuation of International Patent Application No. PCT/JP2010/062806, having an international filing date of Jul. 29, 2010, which designated the United States and which claims priority from Japanese Patent Application No. 2009-186785 filed on Aug. 11, 2009, the entirety of both of which are incorporated herein by reference. This application also claims priority to Japanese Patent Application No. 2009-186785 filed on Aug. 11, 2009, which is also incorporated herein by reference in its entirety.

BACKGROUND

The present invention relates to a large returnable (refillable) container, a method of molding a large returnable container, a large returnable container molding apparatus, and a blow mold having separate heating zones.

A large returnable container having a large capacity (e.g., 3 or 5 gallons (about 20 liters)) is collected from the market, refilled, and reused. A large returnable container has been widely used as a drink container (e.g., mineral water container). It is necessary to wash a used container with alkaline hot water or the like at a temperature of 60 to 70° C. before refilling the container with a drink.

A large returnable container has been produced by injection-molding a polycarbonate (PC) preform, and blow-molding the preform (see JP-A-8-164557).

In recent years, it has been pointed out that elution of a bisphenol A component may occur when a synthetic resin produced using bisphenol A as a raw material (e.g., polycarbonate or epoxy resin) is washed with a powerful cleaner, or comes in contact with an acid or a high-temperature liquid. Therefore, an alternative to polycarbonate has been desired as a material for forming a large returnable container.

An alternative to polycarbonate has also been desired from the viewpoint of product cost. Specifically, polycarbonate has high transparency, heat resistance, impact resistance, and quality, but is expensive. It has been proposed to produce a large returnable container using an inexpensive polyester resin such as polyethylene terephthalate (PET) instead of polycarbonate (PC) (see JP-A-11-34152).

A blow molding method that provides heat resistance to a small or medium-sized container having a capacity of several liters or less (e.g., 500 cc to 2 liters) has been known. Specifically, a primary blow-molded article obtained by subjecting a preform to primary blow molding, or a secondary blow-molded article obtained by subjecting the primary blow-molded article to secondary blow molding, is subjected to a heat treatment, and the resulting intermediate molded article that has been thermally shrunk is subjected to final blow molding to obtain a heat-resistant container (see JP-A-10-286874, JP-B-3777204, JP-A-2006-117289). The degree of crystallinity can be improved and a strain that has occurred during stretch orientation by subjecting the stretch-orientated container to a heat treatment is removed, so that the heat resistance of the container is improved.

SUMMARY

According to one aspect of the invention, there is provided a method of molding a large returnable container comprising:

a heat treatment step that includes subjecting a preform that has a thick wall and formed of a polyester resin, or a primary blow-molded article obtained by subjecting the preform to primary blow molding, to intermediate blow molding with heating to obtain an intermediate molded article from which a strain that has occurred during blow molding has been removed; and a final blow molding step that includes subjecting the intermediate molded article that has shrunk to final blow molding with heating to obtain the large returnable container, the heat treatment step including disposing the preform or the primary blow-molded article in a heat treatment mold, and pressurizing the preform or the primary blow-molded article by introducing high-pressure air into the preform or the primary blow-molded article so that a shoulder and a body that have been formed by blow molding close contact to a cavity surface of the heat treatment mold, and are subjected to a heat treatment, the shoulder being heated at a low temperature as compared with the body.

According to another aspect of the invention, there is provided a method of molding a large returnable container comprising:

a heat treatment step that includes subjecting a primary blow-molded article obtained by subjecting a preform to primary blow molding to secondary blow molding with heating to obtain an intermediate molded article, the preform having a thick wall and formed of a polyester resin, the primary blow-molded article having been stretch-oriented and including a shoulder and a body, and a strain that has occurred during the primary blow molding having been removed from the intermediate molded article; and a final blow molding step that includes subjecting the intermediate molded article that has shrunk to final blow molding with heating to obtain the large returnable container, the heat treatment step including disposing the shoulder and the body of the primary blow-molded article in a heat treatment mold, and pressurizing the primary blow-molded article by introducing high-pressure air into the primary blow-molded article so that the primary blow-molded article close contacts to a cavity surface of the heat treatment mold, and is subjected to a heat treatment, the cavity surface having a shape substantially identical with those of the shoulder and the body of the primary blow-molded article, and the shoulder of the primary blow-molded article being heated at a low temperature as compared with the body of the primary blow-molded article.

According to another aspect of the invention, there is provided a large returnable container formed of a polyester resin comprising:

a neck that is formed when injection-molding a preform that has a thick wall;

a shoulder that is larger in diameter than the neck;

a body that follows the shoulder; and a bottom that closes one end of the body, at least the shoulder and the body being formed by blow-molding the preform in a blow mold so that the preform is stretch-oriented, a shoulder zone of the blow mold being heated at a low temperature as compared with a body zone of the blow mold, the shoulder zone and the body zone being insulated by slits that become exposed on a cavity surface of the blow mold, a strain that has occurred due to stretch orientation having been removed from the shoulder and the body, and lines that are discontinuously formed along a circumferential direction being formed in the large returnable container due to the slit.

According to another aspect of the invention, there is provided a large returnable container molding apparatus comprising:

a heat treatment section that subjects a primary blow-molded article obtained by subjecting a preform having a thick wall to primary blow molding to secondary blow molding with heating to obtain an intermediate molded article, the preform formed of a polyester resin and including a neck, the primary blow-molded article having been stretch-oriented and including a shoulder and a body, and a strain that has occurred during the primary blow molding having been removed from the intermediate molded article; and a final blow molding section that subjects the intermediate molded article that has shrunk to final blow molding with heating to obtain the large returnable container, a strain that has occurred during the final blow molding having been removed from the large returnable container, the heat treatment section including a heat treatment mold that includes a pair of split molds, and has a cavity surface having a shape substantially identical with those of the shoulder and the body of the primary blow-molded article, and a blow air-introducing member that is disposed in the neck of the primary blow-molded article, and pressurizes the primary blow-molded article by introducing high-pressure air into the primary blow-molded article, each of the pair of split molds included in the heat treatment mold including an insulation section that insulates and separates heating zones that respectively correspond to the shoulder and the body of the intermediate molded article that has been subjected to the secondary blow molding, and heating the shoulder of the intermediate molded article at a low temperature as compared with the body of the intermediate molded article.

According to another aspect of the invention, there is provided a blow mold comprising:

a pair of split molds that respectively includes a cavity surface, and a parting surface that is continuous with the cavity surface, the parting surfaces coming in contact with each other when the pair of split molds is clamped, each of the pair of split molds including:

a slit that becomes exposed on the cavity surface so as not to reach the parting surface;

a first temperature control section that is disposed in one of zones divided by the slit; and a second temperature control section that is disposed in the other of the zones divided by the slit, and is adjusted to a temperature differing from that of the first temperature control section.

DESCRIPTION OF EXEMPLARY EMBODIMENTS

Figure 1:
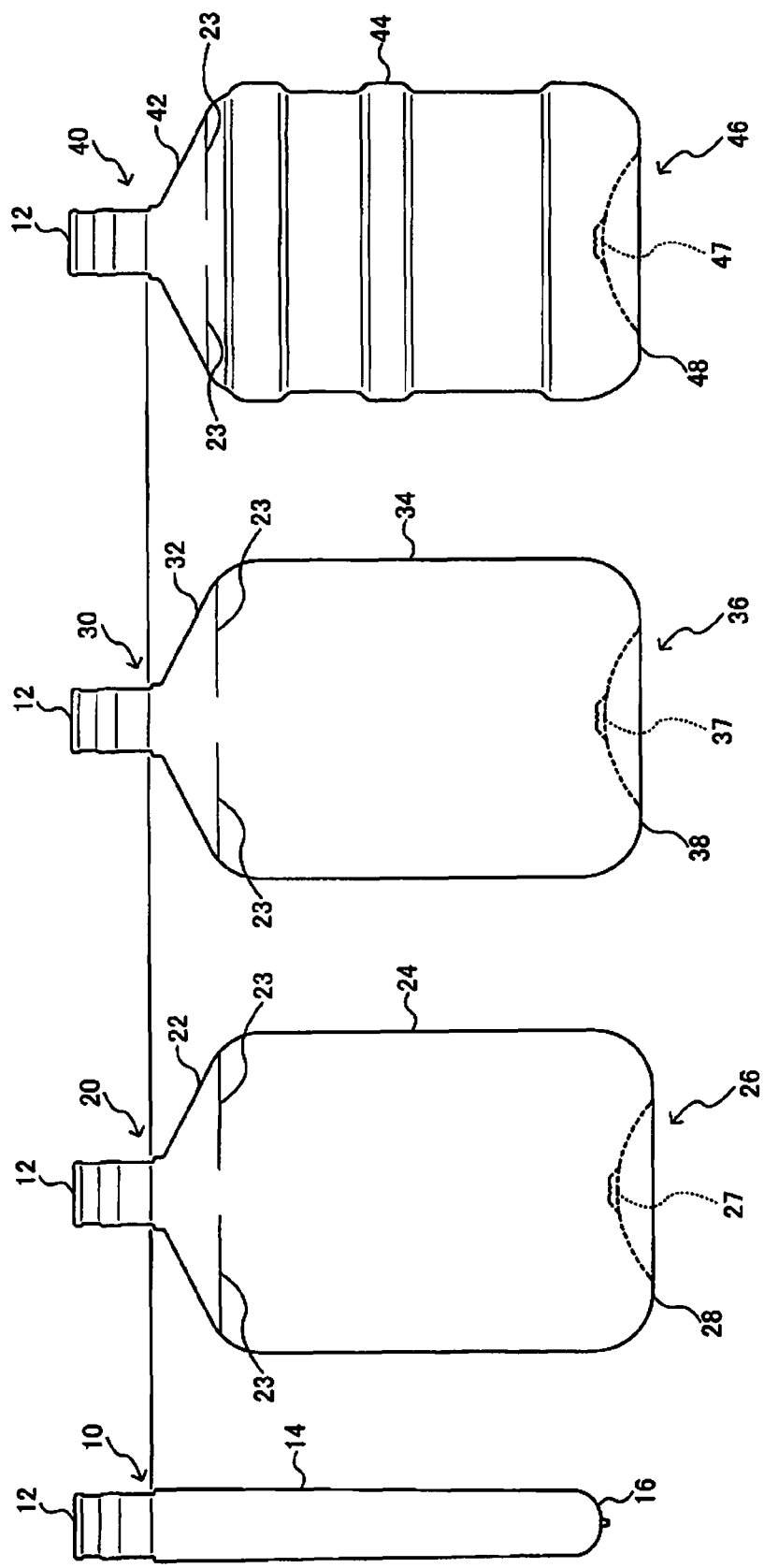
FIG. 1 is a schematic view illustrating a molded article obtained by the main steps according to one embodiment of the invention.

When blow-molding a large returnable container using a polycarbonate (PC) resin, the resulting container exhibits heat resistance due to the heat resistance of the PC resin. However, when molding a large returnable container using a polyester resin (e.g., polyethylene terephthalate (PET)) as an alternative to polycarbonate (PC), the resulting container exhibits inferior heat resistance. A large container that is molded using the method disclosed in JP-A-11-34152 may exhibit transparency, but may not exhibit heat resistance required for the container to endure the washing temperature.

A preform for forming a large container has a thickness (e.g., the thickness of the body is 8 to 10 mm in JP-A-11-34152) equal to or larger than twice that of a preform for forming a small or medium-sized container. When using the method of molding a heat-resistant container disclosed in JP-A-10-286874, JP-B-3777204, JP-A-2006-117289, whitening due to spherulitic crystallization may occur in an area having a relatively large thickness (particularly the shoulder) when the blow-molded article is slowly cooled after heating. When stress whitening has occurred in the body due to a high stretch ratio, the strain can be removed by heating. However, whitening due to spherulitic crystallization caused by a large thickness cannot be eliminated by heating (i.e., transparency deteriorates). The top load resistance deteriorates when reducing the thickness of the shoulder.

As described above, transparency necessarily deteriorates when providing heat resistance to a large returnable container formed of a PET resin. On the other hand, heat resistance necessarily deteriorates when providing transparency to a large returnable container formed of a PET resin.

Several aspects of the invention may provide a large returnable container that exhibits heat resistance and transparency in a well-balanced manner, and exhibits high top load resistance by eliminating the above drawbacks while utilizing the advantages of an area that has a large thickness even after blow molding, a method of molding a large returnable container, a large returnable container molding apparatus, and a blow mold having separate heating zones.

According to one embodiment of the invention, there is provided a method of molding a large returnable container comprising:

a heat treatment step that includes subjecting a preform that has a thick wall and formed of a polyester resin, or a primary blow-molded article obtained by subjecting the preform to primary blow molding, to intermediate blow molding with heating to obtain an intermediate molded article from which a strain that has occurred during blow molding has been removed; and a final blow molding step that includes subjecting the intermediate molded article that has shrunk to final blow molding with heating to obtain the large returnable container, the heat treatment step including disposing the preform or the primary blow-molded article in a heat treatment mold, and pressurizing the preform or the primary blow-molded article by introducing high-pressure air into the preform or the primary blow-molded article so that a shoulder and a body that have been formed by blow molding close contact to a cavity surface of the heat treatment mold, and are subjected to a heat treatment, the shoulder being heated at a low temperature as compared with the body.

According to one embodiment of the invention, a polyester resin such as polyethylene terephthalate is used as the molding material instead of polycarbonate that contains bisphenol A. A thick preform for forming a large returnable container is used instead of a thin preform for forming a small or medium-sized container (e.g., about 500 cc to 2 liters).

The large returnable container is molded from the thick preform by performing at least two blow molding steps (i.e., intermediate blow molding step and final blow molding step) and two heat treatment steps (i.e., the heat treatment step in the intermediate blow molding step and the heat treatment step in the final blow molding step). When subjecting the thick preform to primary blow molding, the body of the preform is stretched at a high stretch ratio due to a long distance to the cavity surface of the primary blow mold, while the shoulder of the preform is stretched at a small stretch ratio and has a thickness larger than that of the body due to a short distance to the cavity surface of the primary blow mold. The first heat treatment step is performed using the heated primary blow mold (intermediate blow mold) as the heat treatment mold, or performed on the primary blow-molded article removed from the primary blow mold using the secondary blow mold (intermediate blow mold) that differs from the primary blow mold as the heat treatment mold.

The preform or the primary blow-molded article is subjected to intermediate blow molding in the heat treatment mold (i.e., primary blow molding of the preform or secondary blow molding of the primary blow-molded article, so that the shoulder and the body obtained by blow molding close contact to the cavity surface of the heat treatment mold, and are subjected to the heat treatment to obtain an intermediate molded article. A strain that has occurred during stretching at a high stretch ratio is removed from the body due to the heat treatment. The shoulder that is thick and has been stretched at a small stretch ratio is heated at a low temperature as compared with the body, so that a strain that has occurred during stretching at a small stretch ratio is removed. Since the heating temperature is low, whitening due to spherulitic crystallization is reduced or prevented. Since the shoulder is thick, a large returnable container that exhibits high top load resistance can be obtained.

According to another embodiment of the invention, there is provided a method of molding a large returnable container comprising:

a heat treatment step that includes subjecting a primary blow-molded article obtained by subjecting a preform to primary blow molding to secondary blow molding with heating to obtain an intermediate molded article, the preform having a thick wall and formed of a polyester resin, the primary blow-molded article having been stretch-oriented and including a shoulder and a body, and a strain that has occurred during the primary blow molding having been removed from the intermediate molded article; and a final blow molding step that includes subjecting the intermediate molded article that has shrunk to final blow molding with heating to obtain the large returnable container, the heat treatment step including disposing the shoulder and the body of the primary blow-molded article in a heat treatment mold, and pressurizing the primary blow-molded article by introducing high-pressure air into the primary blow-molded article so that the primary blow-molded article close contacts to a cavity surface of the heat treatment mold, and is subjected to a heat treatment, the cavity surface having a shape substantially identical with those of the shoulder and the body of the primary blow-molded article, and the shoulder of the primary blow-molded article being heated at a low temperature as compared with the body of the primary blow-molded article.

According to the above embodiment of the invention, the large returnable container is molded by performing three blow molding steps (i.e., primary blow molding step, secondary blow molding step, final blow molding step) and two heat treatment steps (i.e., the heat treatment step in the secondary blow molding step and the heat treatment step in the final blow molding step). According to the above embodiment of the invention, the following advantages are obtained by separating the primary blow molding step and the first heat treatment step, while achieving the advantages obtained by one embodiment of the invention. Specifically, since the preform is heated to an optimum blow temperature, and subjected to primary blow molding to obtain the primary blow-molded article, the shoulder and the body of the primary blow-molded article move on the cavity surface after coming in contact with the cavity surface when subjecting the primary blow-molded article to the heat treatment in the primary blow mold. On the other hand, it is unnecessary to heat the primary blow mold when separately providing the primary blow mold and the heat treatment mold, so that the shape stability of the primary blow-molded article is improved. The shape stability of the final blow-molded article is also improved by processing the primary blow-molded article using the heat treatment mold and the final blow mold. Moreover, the body is stretched to have a small thickness when subjecting the preform to primary blow molding without heating as compared with the case of subjecting the preform to primary blow molding with heating, so that the transparency and the heat resistance of the body are improved.

In the method, the heat treatment step may include separating heating zones that respectively correspond to the shoulder and the body of the primary blow-molded article using an insulation section that insulates the heating zones. This makes it possible to easily control the heating temperature corresponding to each heating zone (i.e., shoulder zone and body zone), and heat the shoulder at an appropriate temperature, so that whitening due to spherulitic crystallization can be reduced or prevented.

In the method, the heat treatment step may include insulating and separating the heating zones using an air insulation layer. Since the air insulation layer can be formed by providing a space between the shoulder heating zone and the body heating zone, the insulation section can be easily formed.

In the method, the heat treatment mold may include a pair of split molds, each of the pair of split molds including a parting surface that is continuous with the cavity surface, the parting surfaces of the pair of split molds coming in contact with each other, and each of the pair of split molds may include a slit that becomes exposed on the cavity surface of the heat treatment mold so as not to reach the parting surface, and the heating zones may be separated by the air insulation layer formed by the slit.

The heating contact surfaces with the shoulder and the body of the primary blow-molded article can be insulated by forming the slit to reach the cavity surface, so that the insulation effect is improved. Since the slit does reach the parting surface, each of the pair of split molds is not completely separated by the slit in the longitudinal direction. This makes it possible to easily handle the pair of split molds.

The method may further comprise:

a first air discharge step that includes discharging air from the intermediate molded article after the heat treatment step; and a second air discharge step that includes discharging air from the large returnable container after the final blow molding step, an air discharge speed in the first air discharge step may be higher than an air discharge speed in the second air discharge step.

This makes it possible to allow the intermediate molded article to thermally shrink freely to have a size smaller than that of the final blow-molded article. This prevents a situation in which the intermediate molded article is clamped by the final blow mold. According to the above embodiment of the invention, since the bottom of the primary blow-molded article has been cooled and solidified, deformation (e.g., turnover) of the bottom of the intermediate molded article does not occur when the bottom shrinks even if air is discharged at a high speed.

In the method, the heat treatment mold may further include a bottom mold that comes in contact with a bottom of the primary blow-molded article, the bottom of the primary blow-molded article being raised and closing one end of the body of the primary blow-molded article, and the heat treatment step may include clamping the bottom mold before clamping the pair of split molds, and centering the primary blow-molded article using the bottom mold.

Since the bottom of the primary blow-molded article has been cooled and solidified, the primary blow-molded article can be centered and positioned before the pair of split molds is clamped, by causing the bottom mold to come in contact with the raised bottom of the primary blow-molded article.

According to another embodiment of the invention, there is provided a large returnable container formed of a polyester resin comprising:

a neck that is formed when injection-molding a preform that has a thick wall;

a shoulder that is larger in diameter than the neck;

a body that follows the shoulder; and a bottom that closes one end of the body, at least the shoulder and the body being formed by blow-molding the preform in a blow mold so that the preform is stretch-oriented, a shoulder zone of the blow mold being heated at a low temperature as compared with a body zone of the blow mold, the shoulder zone and the body zone being insulated by slits that become exposed on a cavity surface of the blow mold, a strain that has occurred due to stretch orientation having been removed from the shoulder and the body, and lines that are discontinuously formed along a circumferential direction being formed in the large returnable container due to the slits.

Since the large returnable container according to the above embodiment of the invention is formed of a polyester, elution of bisphenol A does not occur. Since a strain that has occurred during stretch orientation has been removed, the large returnable container exhibits heat resistance. Since the shoulder has been heated at a low temperature, whitening due to spherulitic crystallization has been reduced or prevented. Moreover, since the discontinuous line is formed in the circumferential direction due to the insulation slit, the large returnable container can be discriminated from another large returnable container.

According to another embodiment of the invention, there is provided a large returnable container molding apparatus comprising:

a heat treatment section that subjects a primary blow-molded article obtained by subjecting a preform having a thick wall to primary blow molding to secondary blow molding with heating to obtain an intermediate molded article, the preform formed of a polyester resin and including a neck, the primary blow-molded article having been stretch-oriented and including a shoulder and a body, and a strain that has occurred during the primary blow molding having been removed from the intermediate molded article; and a final blow molding section that subjects the intermediate molded article that has shrunk to final blow molding with heating to obtain the large returnable container, a strain that has occurred during the final blow molding having been removed from the large returnable container, the heat treatment section including a heat treatment mold that includes a pair of split molds, and has a cavity surface having a shape substantially identical with those of the shoulder and the body of the primary blow-molded article, and a blow air-introducing member that is disposed in the neck of the primary blow-molded article, and pressurizes the primary blow-molded article by introducing high-pressure air into the primary blow-molded article, each of the pair of split molds included in the heat treatment mold including an insulation section that insulates and separates heating zones that respectively correspond to the shoulder and the body of the intermediate molded article that has been subjected to the secondary blow molding, and heating the shoulder of the intermediate molded article at a low temperature as compared with the body of the intermediate molded article.

A large returnable container molding apparatus according to the above embodiment of the invention includes the heat treatment section and the final blow molding section. The heat treatment section includes the heat treatment mold that includes the pair of split molds, and the blow air-introducing member, and the pair of split molds includes the insulation section. Therefore, the method of molding a large returnable container according to the above embodiment of the invention may suitably be implemented by the large returnable container molding apparatus. Moreover, since injection molding of the preform and blow molding of the primary blow-molded article can be implemented using an existing injection stretch blow molding apparatus, it suffices to add only the molding apparatus according to the above embodiment of the invention that includes the heat treatment section and the final blow molding section in order to mold a large returnable container.

The large returnable container molding apparatus may further comprise:

a transfer member that includes the blow air-introducing member, and transfers the primary blow-molded article in an inverted state in which the neck is positioned at a lower end; and a seal piston that is provided in the heat treatment section, and is driven to come in contact with or be removed from the transfer member, the seal piston sealing the transfer member when the seal piston has come in contact with the transfer member so that the high-pressure air is supplied to the blow air-introducing member, and canceling a seal when the seal piston has been removed from the transfer member so that air is discharged from the intermediate molded article.

According to this feature, since a seal of the neck can be canceled by moving the seal piston in a state in which the blow air-introducing member is inserted into the neck, air can be discharged from the intermediate molded article at a high speed. This makes it possible to allow the intermediate molded article to thermally shrink freely to have a size smaller than that of the final blow-molded article. This prevents a situation in which the intermediate molded article is clamped by the final blow mold.

According to another embodiment of the invention, there is provided a blow mold comprising:

a pair of split molds that respectively includes a cavity surface, and a parting surface that is continuous with the cavity surface, the parting surfaces coming in contact with each other when the pair of split molds is clamped, each of the pair of split molds including:

a slit that becomes exposed on the cavity surface so as not to reach the parting surface;

a first temperature control section that is disposed in one of zones divided by the slit; and a second temperature control section that is disposed in the other of the zones divided by the slit, and is adjusted to a temperature differing from that of the first temperature control section.

According to the above embodiment of the invention, since the pair of split molds includes the slit and the first and second temperature control sections that are insulated by air (slit) and achieve a different temperature, it is possible to provide a blow mold that may be suitable for the method of molding a large returnable container according to the above embodiment of the invention, or the large returnable container molding apparatus according to the above embodiment of the invention.

In the large returnable container molding apparatus, each of the pair of split molds may include a hole into which a wire for forming the slit by a wire cutting operation is inserted, and the slit may communicate with the hole.

This makes it possible to form the slit by performing a wire cutting operation on the pair of split molds while moving a wire inserted into the hole when producing the pair of split molds.

Preferred embodiments of the invention are described in detail below. Note that the following embodiments do not in any way limit the scope of the invention defined by the claims laid out herein. Note also that all of the elements of the following embodiments should not necessarily be taken as essential elements of the invention.

1. Outline of Blow Molding Method that Ensures Heat Resistance

FIG. 1 shows a preform 10, a primary blow-molded article 20, an intermediate molded article 30, and a final blow-molded article 40 obtained by the main steps of a method of producing a large returnable container according to several embodiments of the invention. The molded articles 10, 20, 30, and 40 include a neck 12, and differ in the shape of the section under the neck 12.

The preform 10 is injection-molded using a polyester resin (e.g., PET resin). The preform 10 includes the neck 12 that is open, a tubular body 14 that follows the neck 12, and a bottom 16 that closes one end of the body 14. A PET copolymer having a low crystallization speed ("9921" manufactured by Kodak (copolymer with cyclohexanemethanol)) may be used as the PET resin. Note that another polyester resin may also be used.

The neck 12 of the preform 10 has an inner diameter of 40 to 60 mm, and the body 14 of the preform 10 has a thickness of 6 to 9 mm (preferably 8 mm or less) (i.e., the preform 10 is thick), for example. The thickness of the body of a preform used to produce a small or medium-sized container can be normally reduced to 4 mm or less by increasing the longitudinal length. However, a large amount (600 to 750 g) of resin is required to produce the preform 10 that is used to produce a large container in order to provide the container with a large capacity and sufficient top load resistance. Therefore, the body 14 of the preform 10 has a thickness equal to or larger than twice the thickness of the body of a preform used to produce a small or medium-sized container even if the length of the preform is maximized (e.g., about 400 to 500 mm) so that the longitudinal stretch ratio is close to 1. If the thickness of the body of the preform 10 exceeds 9 mm, spherulitic crystallization (whitening) may occur during blow molding even if the above resin material (copolymer) is used.

The primary blow-molded article 20 that is obtained by subjecting the body 14 and the bottom 16 of the preform 10 to primary blow molding includes the neck 12 that is formed by injection molding, a shoulder 22 that follows the neck 12, a body 24 that follows the shoulder 22, and a bottom 26 that closes one end of the body 24. The bottom 26 includes a raised bottom 27 that is positioned at the center, and a bearing (heel) section 28 that is positioned around the raised bottom 27. The primary blow-molded article 20 is molded so that the body 24 has a diameter and a length larger than those of the final blow-molded article 40.

The intermediate molded article 30 is obtained by subjecting the primary blow-molded article 20 to secondary blow molding (intermediate blow molding) in a heated secondary blow mold (also referred to as "intermediate blow mold"; the secondary blow mold has the same dimensions as those of a primary blow mold, for example), and discharging air from the heat-set secondary blow-molded article so that the secondary blow-molded article is thermally shrunk (first embodiment). Alternatively, the intermediate molded article 30 is obtained by heat-setting the primary blow-molded article obtained by primary blow molding (intermediate blow molding) in a heated primary blow mold (also referred to as "intermediate blow mold"), and discharging air from the primary blow-molded article so that the primary blow-molded article is thermally shrunk (second embodiment).

The intermediate molded article 30 includes the neck 12 that is formed by injection molding, a shoulder 32 that follows the neck 12, a body 34 that follows the shoulder 22, and a bottom 36 that closes one end of the body 34. The bottom 36 includes a raised bottom 37 that is positioned at the center, and a bearing section 38 that is positioned around the raised bottom 37. Since the intermediate molded article 30 is obtained by thermally shrinking the primary blow-molded article 20 (or the secondary blow-molded article), the body 34 of the intermediate molded article 30 has a diameter and a length smaller than those of the final blow-molded article 40.

The intermediate molded article 30 has a high degree of crystallinity and a strain or a residual stress that has occurred due to stretch orientation during primary blow molding has been removed by the heat treatment (heat setting). Since the intermediate molded article 30 has been thermally shrunk after the heat treatment, the final blow-molded article 40 thermally shrinks to only a small extent, even if the final blow-molded article 40 is subsequently heated at a temperature equal to or lower than the heat treatment temperature. The high-temperature shape stability of the final blow-molded article 40 is improved by subjecting the intermediate molded article 30 to the heat treatment.

The final blow-molded article 40 (i.e., large returnable container) is obtained by subjecting the intermediate molded article 30 to final blow molding in a heated final blow mold. The final blow-molded article 40 includes the neck 12 that is formed by injection molding, a shoulder 42 that follows the neck 12, a body 44 that follows the shoulder 42, and a bottom 46 that closes one end of the body 44. The bottom 46 includes a raised bottom 47 that is positioned at the center, and a bearing section 48 that is positioned around the raised bottom 47.

The body 44 of the final blow-molded article 40 has an outer diameter of 260 to 280 mm, and the neck 12 of the final blow-molded article 40 has an inner diameter of 40 to 50 mm (i.e., the final blow-molded article 40 is classified as a narrow-neck container). The body 44 of the final blow-molded article 40 has an outer diameter larger than that of the body 14 of the preform 10 by a factor of 4.5 to 6 in the circumferential direction. The thickness of the body 44 is 0.6 to 1 mm. The final blow-molded article 40 exhibits top load resistance as a result of setting the thickness of the shoulder 42 to be larger than that of the body 44.

The body 34 and the bottom 36 of the intermediate molded article 30 have an outer diameter and a length smaller to some extent than those of the body 44 and the bottom 46 of the final blow-molded article 40. This makes it possible to prevent a situation in which the intermediate molded article 30 is clamped between a pair of split molds of the final blow mold, and ensure that stretching occurs to only a small extent during final blow molding. Therefore, only a small amount of strain or residual stress occurs during final blow molding. Moreover, since the intermediate molded article 30 is heat-set in the heated final blow mold, the strain can be completely removed. This makes it possible to improve the thermal stability of the final blow-molded article 40.

Note that lines 23 that are discontinuously formed along the circumferential direction are formed on the primary blow-molded article 20, the intermediate molded article 30, and the final blow-molded article 40 due to an insulation slit (described below) formed in the primary blow mold. When using the molding method according to the first embodiment, the line 23 is not formed in the primary blow-molded article 20 subjected to primary blow molding, but is formed on the primary blow-molded article 20 subjected to secondary blow molding in the secondary blow mold having the same dimensions as those of the primary blow mold.

2. First Embodiment

The first embodiment in which the final blow-molded article 40 is obtained by subjecting the injection-molded preform 10 to three blow molding steps and two heat treatment steps is described below.

Figure 2:
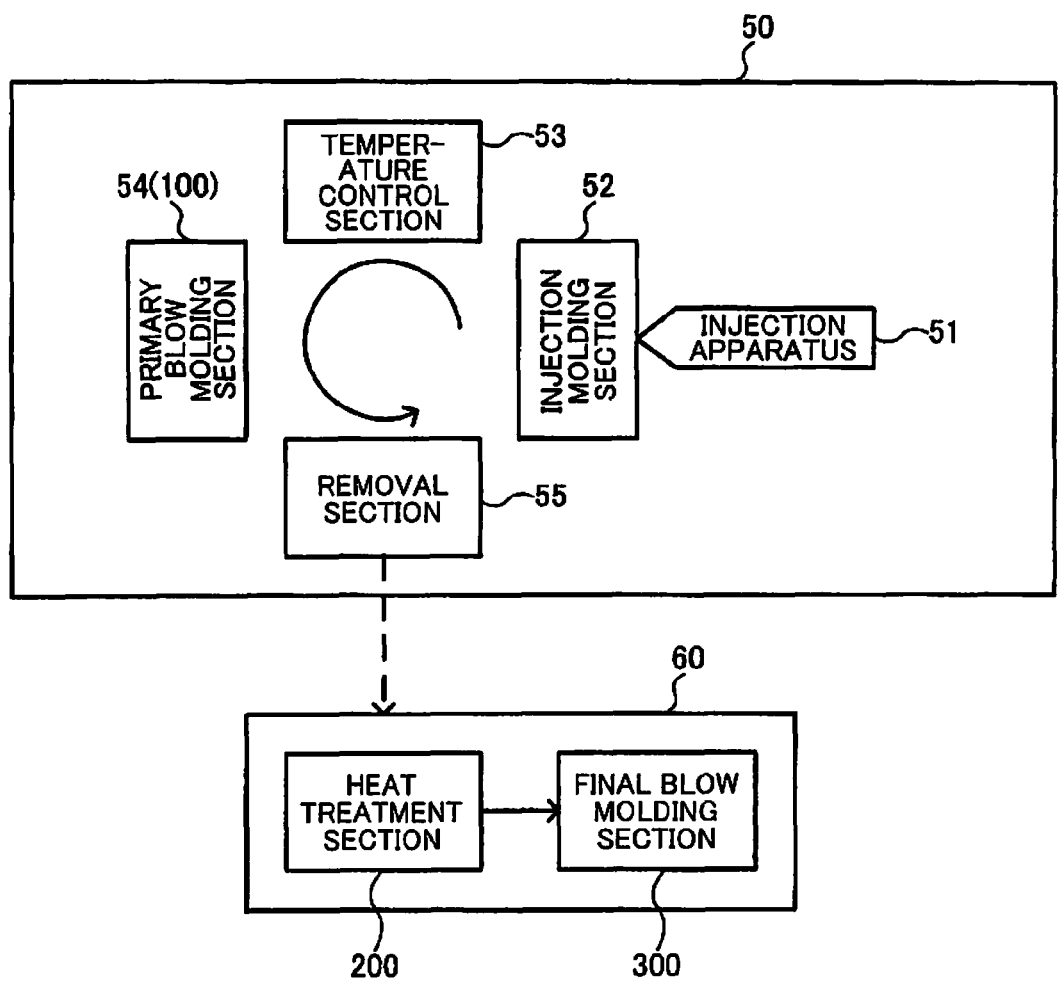
FIG. 2 is schematic plan view showing a molding apparatus according to one embodiment of the invention.

The preform 10 and the primary blow-molded article 20 shown in FIG. 1 may be molded using the injection stretch blow molding apparatus shown in FIG. 2 of JP-A-11-34152, for example. As shown in FIG. 2, an injection stretch blow molding apparatus 50 includes an injection molding section 52 to which an injection apparatus 51 is connected, a temperature control section 53, a primary blow molding section 54 (100), and a removal section 55. The preform 10 that has been injection-molded using the injection stretch blow molding apparatus 50, or the primary blow-molded article 20 that has been subjected to primary blow molding using the injection stretch blow molding apparatus 50, is rotated (transferred) by 90° using a rotary table (not shown) in a state in which the neck is held by a neck mold.

Note that the temperature control preliminary blow molding step performed by the injection stretch blow molding apparatus shown in FIG. 2 of JP-A-11-34152 may also be performed. Specifically, the injection-molded preform 10 is disposed in a temperature control pot, and a temperature control blow core mold is inserted into the neck 12 of the preform 10 (see FIG. 3 of JP-A-11-34152). The preform 10 is subjected to preliminary blow molding by applying a blow pressure so that the preform 10 comes in contact with the inner surface of the temperature control pot, and heated to an optimum blow temperature. The outer diameter of the preform 10 increases (e.g., maximum diameter of body: about 90 mm) due to preliminary blow molding, so that the thickness of the preform 10 decreases. This makes it possible to improve the temperature control efficiency, and the stretch (draw) ratio can be reduced when subjecting the preform 10 to primary blow molding to obtain the primary blow-molded article 20. Therefore, primary blow molding can be implemented at a low temperature without causing stress whitening.

The primary blow-molded article 20 removed from the injection stretch blow molding apparatus 50 is supplied in-line or off-line to a large returnable container molding apparatus 60. The large returnable container molding apparatus 60 includes a heat treatment section 200 and a final blow molding section 300. The large returnable container molding apparatus 60 need not necessarily be connected in-line to the injection stretch blow molding apparatus 50. The primary blow-molded article 20 that has been sufficiently cooled to room temperature may be supplied to the large returnable container molding apparatus 60 (i.e., off-line connection). In this case, the molding operation of the large returnable container molding apparatus 60 is not restricted by the molding cycle (injection molding cycle that takes time) of the injection stretch blow molding apparatus 50, so that the throughput is improved.

The details of the primary blow molding section 100 included in the injection stretch blow molding apparatus 50, and the heat treatment section 200 and the final blow molding section 300 included in the large returnable container molding apparatus 60, are described below. Note that the following description is given taking an example in which the primary blow molding section 100, the heat treatment section 200, and the final blow molding section 300 perform the blow molding operation in a state in which the neck 12 is positioned at the upper end (i.e., upright state) for convenience of illustration. When providing the large returnable container molding apparatus 60 separately from the injection stretch blow molding apparatus 50, the large returnable container molding apparatus 60 can perform the blow molding operation in a state in which the neck 12 is positioned at the lower end (i.e., inverted state). Since the large returnable container molding apparatus 60 does not include an injection molding section, the molded article can be transferred in an inverted state. The mechanism is simplified since a neck mold that can be opened and closed is not used (described below).

2.1. Primary Blow Molding Section

Figure 3:
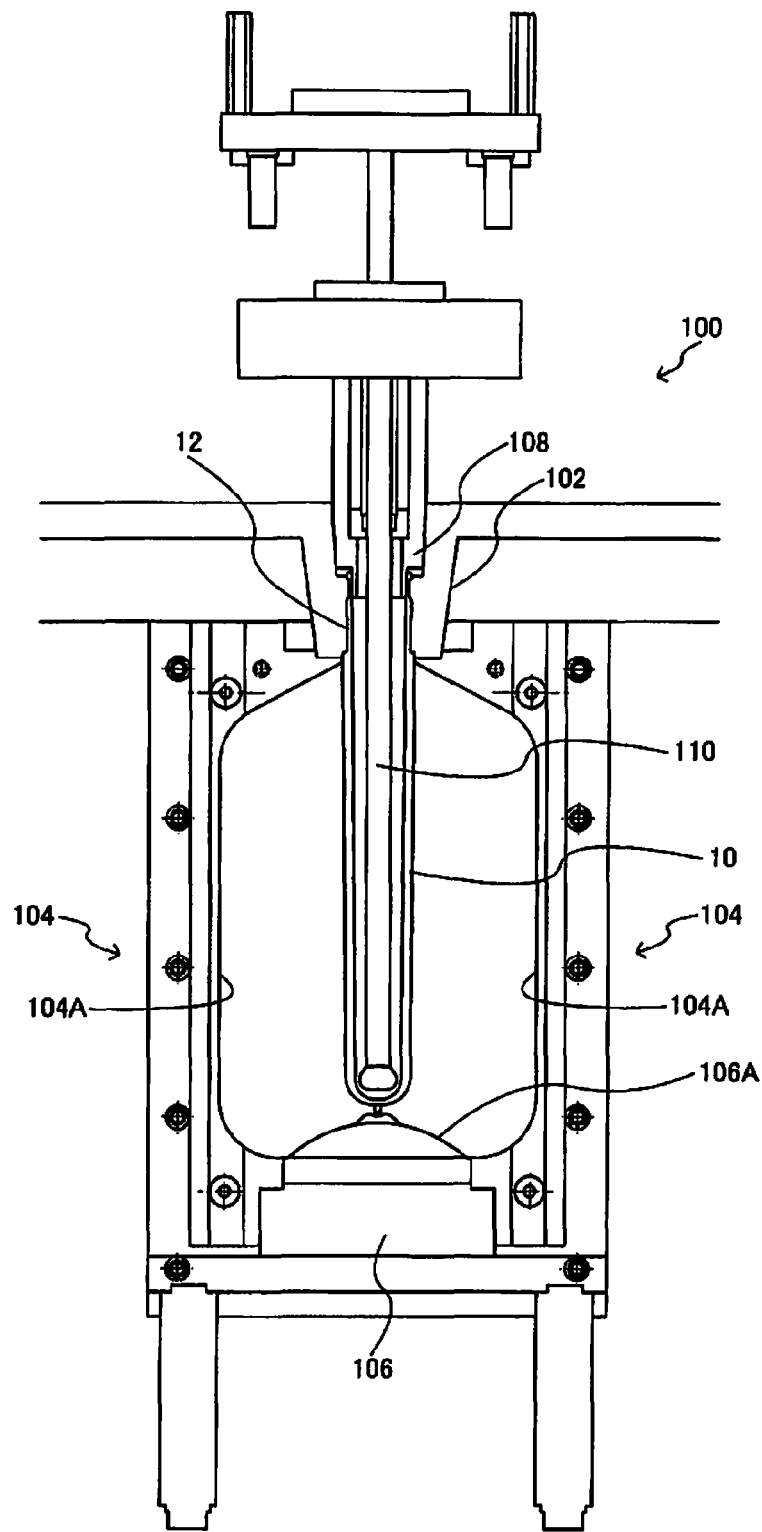
FIG. 3 is a schematic cross-sectional view showing a primary blow molding section.

FIG. 3 is a schematic cross-sectional view showing the primary blow molding section 100. The preform 10 that has been injection-molded by the injection molding section 52 is transferred to the primary blow molding section 100 through the temperature control section 53 in a state in which the neck 12 is held by a neck mold 102 that includes a pair of split molds. The primary blow molding section 100 includes a pair of primary blow split molds 104 that is clamped to the neck mold 102. The pair of primary blow split molds 104 has a cavity surface 104A that defines the external shape of the body 22 of the primary blow-molded article 20. In the first embodiment, the pair of primary blow split molds 104 is not provided with a heating mechanism. The primary blow molding section 100 may include a primary bottom mold 106 that can be moved up and down, and is clamped to the pair of primary blow split molds 104. The primary bottom mold 106 has a cavity surface 106A that defines the bottom 26 of the primary blow-molded article 20. Note that the primary bottom mold 106 may be omitted when the pair of primary blow split molds 104 includes a bottom mold.

The primary blow molding section 100 includes a primary blow core mold 108 that can be moved up and down, and is inserted into the neck 12 of the preform 10. The primary blow core mold 108 introduces high-pressure air into the preform 10. Air can be discharged from the primary blow-molded article 20 by withdrawing (raising) the primary blow core mold 108 through the neck 12 after primary blow molding. A primary stretching (drawing) rod 110 that is inserted into the primary blow core mold 108 and disposed in the preform 10 is provided so that the primary stretching rod 110 can be moved up and down. As shown in FIG. 3, the longitudinal stretch ratio of the preform 10 along the longitudinal centerline of the preform 10 is about 1. The primary stretching rod 110 that has the longitudinal stretching function can center the preform 10 during primary blow molding by positioning the preform 10 between the primary bottom mold 106 and the primary stretching rod 110.

The injection-molded preform 10 is transferred to the primary blow molding section 100 after being heated to an optimum blow temperature. Note that primary blow molding may be implemented by a hot parison method (one-stage method) that utilizes the preform 10 that retains heat applied during injection molding, or may be implemented by a cold parison method (two-stage method) that heats the preform 10 that has returned to room temperature after injection molding to an optimum blow temperature.

2.2. Heat Treatment Section (Secondary Blow Molding Section)

Figure 4:
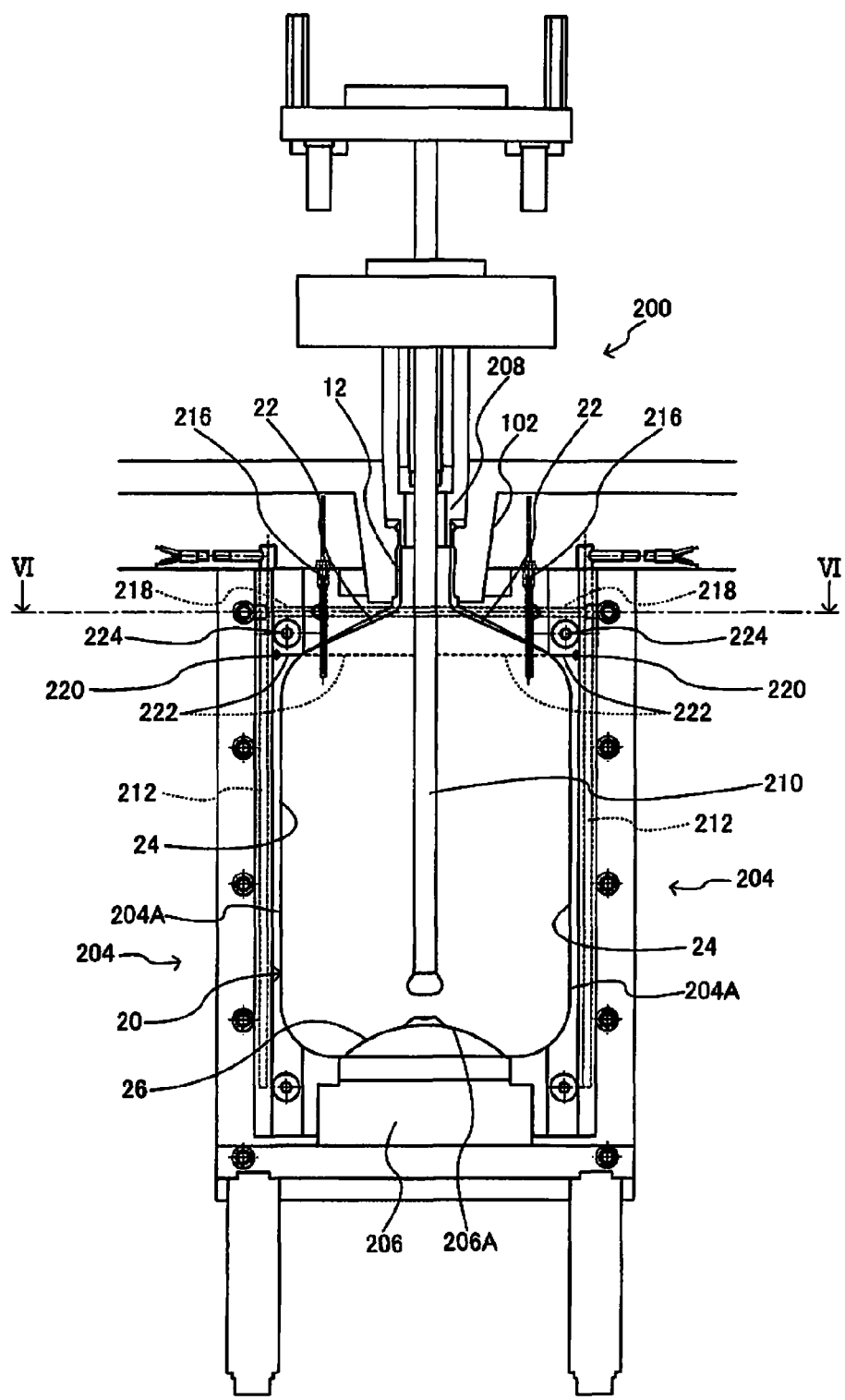
FIG. 4 is a schematic cross-sectional view showing a heat treatment section.

The heat treatment section 200 subjects the primary blow-molded article 20 to secondary blow molding in a heated secondary blow mold, and thermally shrinks the primary blow-molded article 20 to obtain the intermediate molded article 30. As shown in FIG. 4, the heat treatment section 200 includes a neck mold 202, a pair of secondary blow split molds 204, a secondary bottom mold 206, a secondary blow core mold (blow air-introducing member) 208, and a secondary stretching rod 210 that form a secondary blow molding section and have the same functions as those of the respective members included in the primary blow molding section 100. A cavity surface 204A of the pair of secondary blow split molds 204 and a cavity surface 206A of the secondary bottom mold 206 included in the heat treatment section 200 have substantially the same dimensions as those of the cavity surface 104A of the pair of primary blow split molds 104 and the cavity surface 106A of the primary bottom mold 106 included in the primary blow molding section 100. Specifically, since the heat treatment section 200 is provided to remove a strain that has occurred in the primary blow-molded article, it is preferable not to cause the primary blow-molded article 20 to undergo stretch orientation during secondary blow molding. Since the primary blow-molded article 20 is stretched to only a small extent during secondary blow molding, the blow capability is not affected even if the primary blow-molded article 20 that has been removed from the injection stretch blow molding apparatus 50 shown in FIG. 2 and is supplied in-line or off-line has a temperature almost equal to room temperature.

Figure 8:
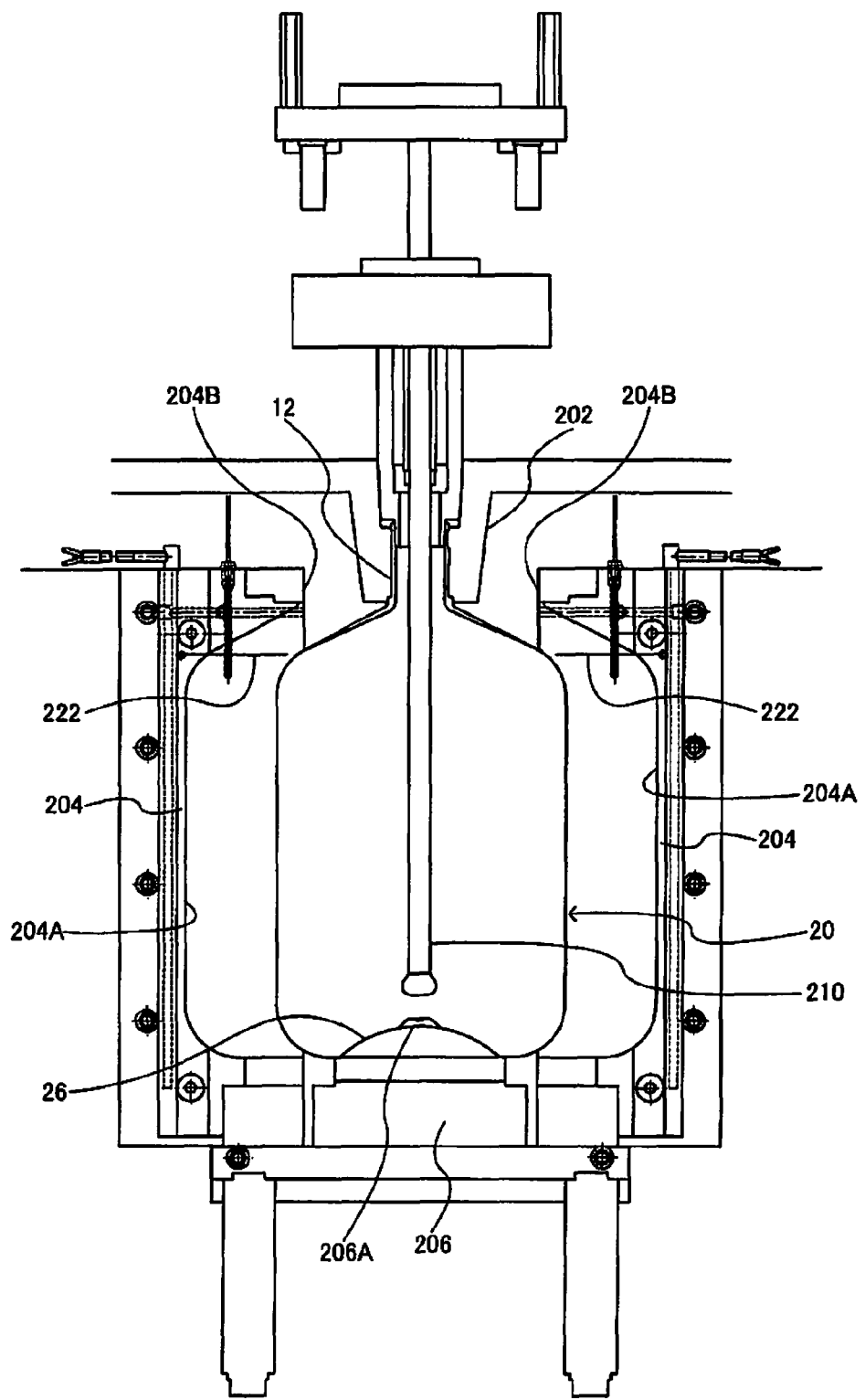
FIG. 8 is a schematic cross-sectional view showing the clamping movement of a secondary bottom mold.

As shown in FIG. 8, the secondary bottom mold 206 is clamped before clamping the pair of secondary blow split molds 204. Since the bottom 26 of the primary blow-molded article 20 has been cooled (is hard), the raised bottom 26 of the primary blow-molded article 20 is centered by clamping the secondary bottom mold 206.

High-pressure air is introduced into the primary blow-molded article 20 centered by the secondary bottom mold 206 through the secondary blow core mold 208, and the secondary stretching rod 210 is driven in the longitudinal direction. This causes the shoulder 22, the body 24, and the bottom 26 of the primary blow-molded article 20 to close contact to the cavity surfaces 204A and 206A.

The heat treatment section 200 differs from the primary blow molding section 100 in that the pair of secondary blow split molds 204 includes a heating section. Since the heat treatment section 200 is provided to remove a strain that has occurred in the primary blow-molded article 20 during primary blow molding through the heat treatment, the heat treatment section 200 includes the heating section.

The pair of secondary blow split molds 204 (blow mold in a broad sense) includes a zone heating section that heats the shoulder 22 and the body 24 of the primary blow-molded article 20 at a different temperature.

Figure 5:
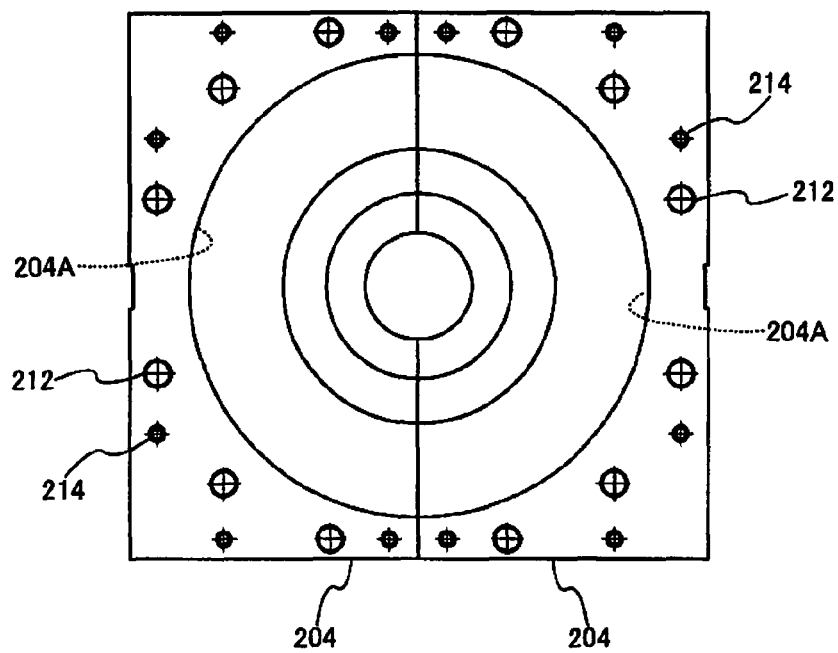
FIG. 5 is a plan view showing a pair of secondary blow split molds.

As shown in FIGS. 4 and 5, six longitudinal holes 212 for disposing a rod-like heater are formed through each of the pair of secondary blow split molds 204 around the cavity surface 204A at almost equal intervals in the circumferential direction (i.e., twelve longitudinal holes 212 are formed in total) in order to heat the body of the primary blow-molded article 20. A heating section such as a rod-like heater (not shown) is disposed in each longitudinal hole 212. The rod-like heater (not shown) has an effective heater length over the entire length of the body 24 of the primary blow-molded article 20. A bottomed longitudinal hole 214 for disposing a thermocouple is formed near each longitudinal hole 212. The heating temperature of the body 24 can be controlled by disposing a thermometric element such as a thermocouple 216 (see FIG. 4) in each longitudinal hole 214, and feeding back the measured temperature. A first temperature control section is formed by the longitudinal holes 212 and 214, the heating section, and the thermometric element.

Figure 6:
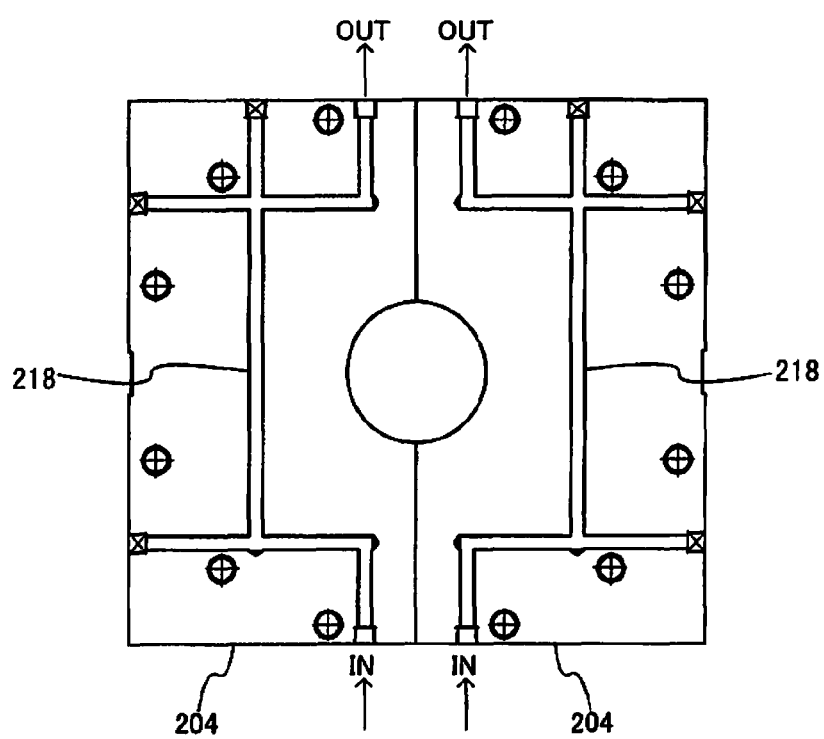
FIG. 6 is a cross-sectional view taken along the line VI-VI in FIG. 4.

As shown in FIGS. 4 and 6, a heating medium passage 218 (i.e., heating section) is formed in each of the pair of secondary blow split molds 204 to surround the shoulder 22 at a height corresponding to the shoulder 22 of the primary blow-molded article 20 in order to heat the shoulder 22 of the primary blow-molded article 20. The shoulder 22 of the primary blow-molded article 20 is heated by passing a heating medium through each heating medium passage 218. The heating temperature of the shoulder 22 can be controlled by providing a thermometric element (not shown) that measures the mold temperature set using the heating medium that flows through each heating medium passage 218, and feeding back the measured temperature. A second temperature control section is formed by the heating section 218 and the thermometric element.

The shoulder 22 and the body 24 of the primary blow-molded article 20 can be heated at a different temperature by separately heating the shoulder 22 and the body 24 using the first temperature control section and the second temperature control section.

In the first embodiment, the shoulder 22 is heated at a low temperature as compared with the body 24. This is because the shoulder 22 and the body 24 of the primary blow-molded article 20 differ in thickness. The body 24 of the primary blow-molded article 20 has been stretched at a high stretch ratio, and is sufficiently thinner than the shoulder 22. As shown in FIG. 4, the distance from the sidewall of the preform 10 to the cavity surface 104A is short (i.e., the transversal stretch ratio is small) in the shoulder 22 of the primary blow-molded article 20 as compared with the body 24 of the primary blow-molded article 20. Therefore, the shoulder 22 of the primary blow-molded article 20 forms a thickness transition section that is thick on the side of the neck 12 and decreases in thickness as the distance from the body 24 decreases (see FIG. 4).

The shoulder 22 that has a relatively large thickness has a heat capacity higher than that of the body 24. Therefore, when the shoulder 22 has come in contact with the cavity surface 204A due to the blow pressure, and has been heated, the shoulder 22 easily maintains its temperature.

After the primary blow-molded article 20 has come in contact with the cavity surface 204A due to high-pressure air, and has been heated for a given time (e.g., 8 to 16 seconds), the air pressure is canceled, and the secondary blow core mold 208 is moved upward, and removed through the neck 12 of the primary blow-molded article 20. Therefore, air is discharged from the primary blow-molded article 20 at a burst. As a result, the primary blow-molded article 20 can thermally shrink freely, and the intermediate molded article 30 is formed via longitudinal and transversal thermal shrinkage. Note that the shrinkage rate is about 10 to 30% in terms of capacity, and is about 5 to 15% in terms of total height.

Since the shoulder 32 of the intermediate molded article 30 is thicker than the body 34, the shoulder 32 is not cooled promptly due to a high heat capacity. Therefore, the shoulder 32 having a large thickness is slowly cooled, and is easily whitened due to spherulitic crystallization.

Whitening due to crystallization can be reduced or prevented by reducing the heating temperature of the shoulder 32 as compared with the heating temperature of the body 34. In the first embodiment, the heating temperature of the body 24 of the primary blow-molded article 20 is set to 140 to 180° C., and the heating temperature of the shoulder 22 is set to 100 to 120° C. so that the intermediate molded article 30 has transparency.

It is preferable to insulate the shoulder zone and the body zone of the pair of secondary blow split molds 204 in order to set the shoulder zone and the body zone at a different heating temperature. In the first embodiment, a transversal hole 220 is formed in the shoulder zone of each of the pair of secondary blow split molds 204. A slit 222 (insulation section in a broad sense) (see FIG. 4) is formed by inserting a wire (not shown) into the transversal hole 220, and performing a wire cutting operation while horizontally moving the wire toward the cavity surface 204A. As shown in FIG. 8, the slit 222 becomes exposed on the cavity surface 204A of each of the pair of secondary blow split molds 204 so as not to reach a parting surface 204B. If the slit 222 is formed to reach the parting surface 204B, the pair of secondary blow split molds 204 is divided in the longitudinal direction.

Since the slit 222 forms an air insulation layer in a space having a given width (e.g., 0.3 mm), the shoulder zone and the body zone can be insulated by air. This makes it possible to easily maintain the shoulder zone and the body zone at a different heating temperature.

Since the volume of the shoulder zone of the pair of secondary blow split molds 204 separated by the slit 222 is small, a bolt hole 224 (see FIG. 4) is formed in the shoulder zone in order to prevent movement within the range of the slit 222. The shoulder zone can be secured using a bolt that is screwed into the bolt hole 224.

When causing the primary blow-molded article 20 to close contact to the cavity surface 204A of the pair of secondary blow split molds 204 (in which the slit 222 is formed) by applying a blow pressure, the lines 23 that are discontinuously formed along the circumferential direction are formed in the primary blow-molded article 20 due to each slit 22. Each line 23 forms an arc at an angle of less than 180° when viewed from above (i.e., from the side of the neck 12 of the primary blow-molded article 20). Each line 23 also remains in the intermediate molded article 30 and the final blow-molded article 40. Note that each line 23 may be made difficult to observe by providing crimp processing (e.g., minute elevation/depression pattern) or the like in the area of the final blow-molded article 40 in which the line 23 is formed during final blow molding.

It was found that the air discharge speed is important in order to form the intermediate molded article 30 by allowing the primary blow-molded article 20 to thermally shrink freely. Experiments conducted by the inventors of the invention revealed that the peripheral length of the body of the intermediate molded article 30 decreases by 20 to 30 mm, and the total height of the intermediate molded article 30 decreases by 2 to 5 mm when setting the air discharge time to 5 seconds (i.e., increasing the air discharge speed) as compared with the case where the air discharge time is set to 10 seconds. In the first embodiment, the intermediate molded article 30 must have a size smaller than that of the final blow-molded article 40, otherwise the intermediate molded article 30 is clamped by the final blow mold.

In the first embodiment, the air discharge time (i.e., the air discharge time in a first air discharge step) of the heat treatment section 200 is set to as short as 5 to 7 seconds (e.g., 6 seconds) (i.e., the air discharge speed is increased). The air discharge time (i.e., the air discharge time in a second air discharge step) of the primary blow molding section 100 and the final blow molding section 300 is set to 20 to 25 seconds. Specifically, the air discharge speed of the heat treatment section 200 is 3 to 5 times the air discharge speed of the primary blow molding section 100 and the final blow molding section 300. This makes it possible to shrink the intermediate molded article 30 to have a size smaller than that of the final blow-molded article 40. Since the primary blow-molded article 20 is not heated by the primary blow molding section 100, and the bottom 26 of the primary blow-molded article 20 is not heated by the heat treatment section 200, the bottom 26 has been cooled and solidified. Therefore, deformation (e.g., turnover) of the bottom 26 does not occur when the bottom 26 is separated from the secondary bottom mold 206 and shrinks, even if air is discharged at a high speed.

Figure 7:
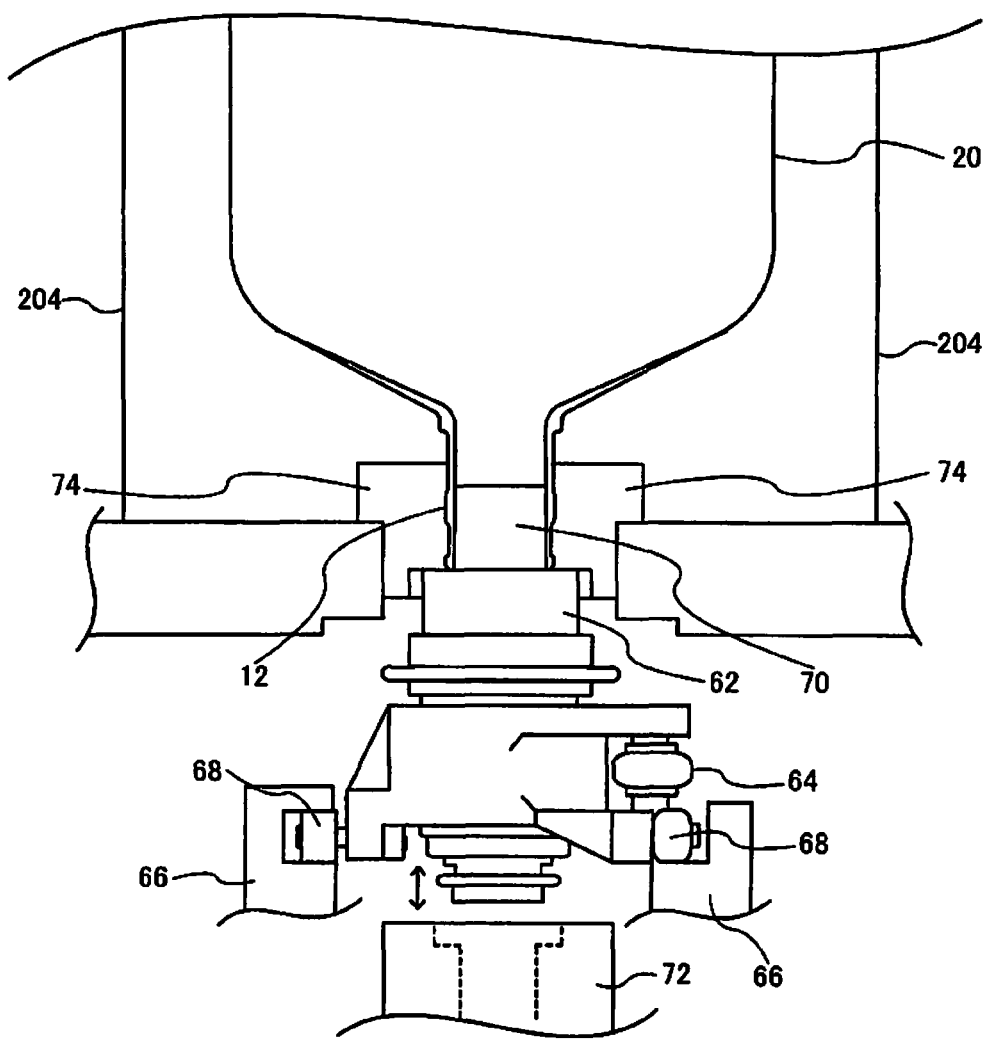
FIG. 7 is a schematic cross-sectional view showing a modification in which a molded article is transferred in an inverted state.
Figure 9:
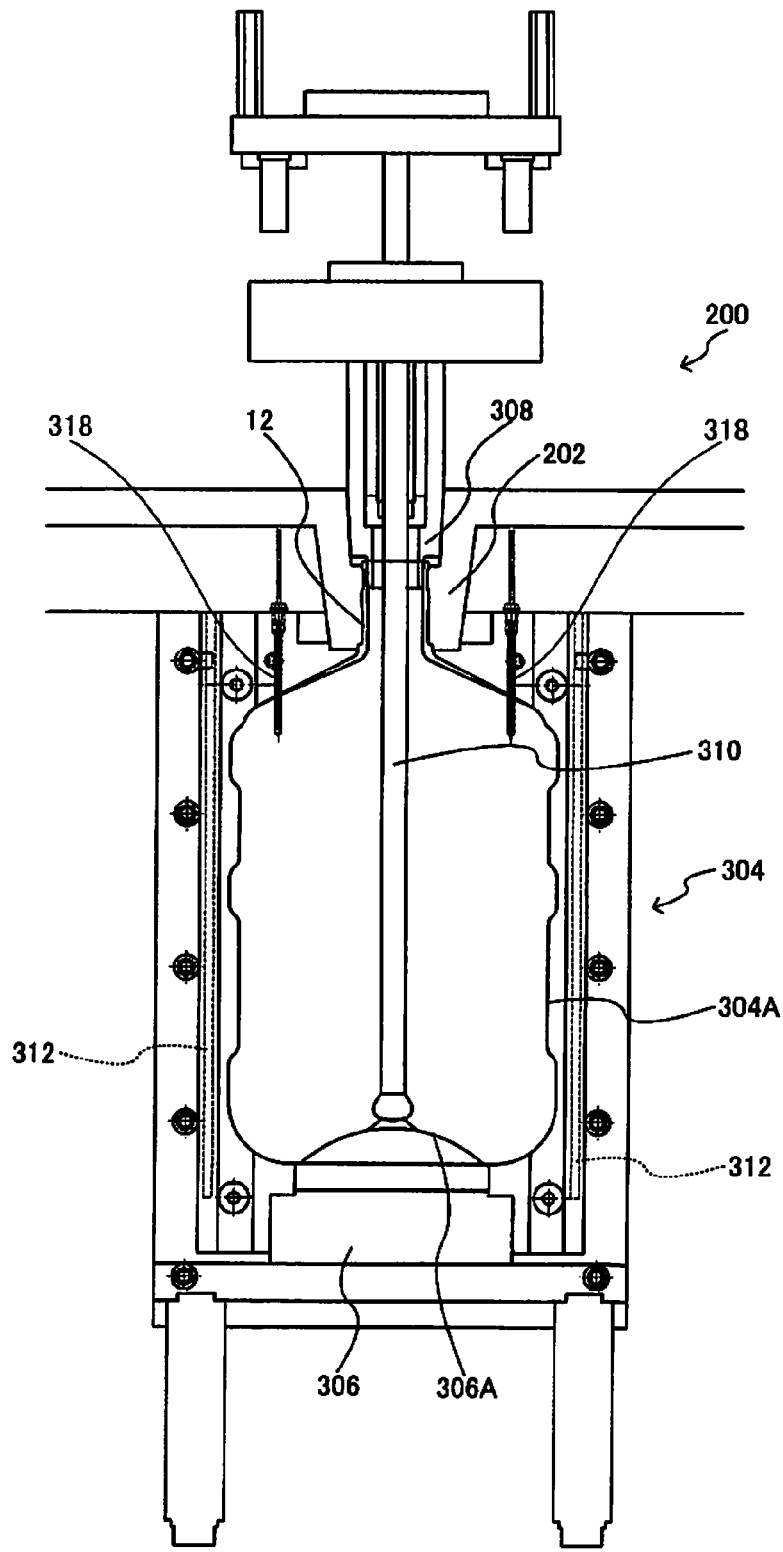
FIG. 9 is a schematic cross-sectional view showing a final blow molding section.

The primary blow molding section 200 and the final blow molding section 300 can transfer the molded article in an inverted state (i.e., the neck 12 is positioned at the lower end), differing from FIGS. 3 and 9. In this case, the primary blow-molded article 20, the intermediate molded article 30, or the final blow-molded article 40 is placed on a transfer member 62 in an inverted state in the primary blow molding section 100 and the final blow molding section 300, as shown in FIG. 7.

The transfer member 62 includes a cam follower 68 that is secured on a transfer chain 64, and moves along a rail 66 in order to transfer the molded article in the large returnable container molding apparatus 60 shown in FIG. 2. The transfer member 62 includes a hollow transfer pin 70 (blow air-introducing member) that is inserted into the neck of each molded article (20, 30, or 40). A seal piston 72 for supplying blow air to the transfer pin 70 during primary blow molding or final blow molding is provided below the transfer member 62. The seal piston 72 moves upward toward the transfer member 62, and seals the transfer member 62. Note that the primary blow molding section 100 and the final blow molding section 300 include a cooled neck guide member 74 that positions the neck 12.

When using the inverted transfer method, the seal piston 72 that can be moved up and down is provided instead of providing the primary blow core mold 108 that is inserted into and removed from the neck 12 (see FIG. 3). Since a seal can be canceled by lowering only the seal piston 72 while maintaining a state in which the transfer pin 70 is inserted into the neck 12, the air discharge speed can be increased as compared with the case of withdrawing (removing) the primary blow core mold 108 through the neck 12. Note that a stretching rod (omitted in FIG. 7) may be disposed through the transfer member 62 and the seal piston 72.

2.3. Final Blow Molding Section

The final blow molding section 300 shown in FIG. 9 subjects the intermediate molded article 30 to final blow molding using a final blow mold to obtain the final blow-molded article 40. The final blow molding section 300 includes a pair of final blow split molds 304, a final bottom mold 306, a final blow core mold 308, and a final stretching rod 310 that have the same functions as those of the respective members included in the primary blow molding section 100. A cavity surface 304A of each of the pair of final blow split molds 304 and a cavity surface 306A of the final bottom mold 306 included in the final blow molding section 300 have a shape identical with the shape of the outer wall of the body 44 and the bottom 46 of the final blow-molded article 40. Note that the cavity surface 304A of each of the pair of final blow split molds 304 is slightly larger than the external shape of the intermediate molded article 30, and the cavity surface 306A of the final bottom mold 306 has a shape identical with that of the cavity surface 106A of the primary bottom mold 106 and the cavity surface 206A of the secondary bottom mold 206. This is because it suffices that the final blow molding section 300 merely mold the intermediate molded article 30 from which the strain has been removed and which has been shrunk into the final blow-molded article 40 at a minimum stretch ratio.

The final blow molding section 300 is configured so that high-pressure air is introduced into the intermediate molded article 30 that is centered by the final stretching rod 310 and the final bottom mold 306 through the final blow core mold 308 (or the seal piston 72 shown in FIG. 6 when using the inverted transfer method). This causes the shoulder 32, the body 34, and the bottom 36 of the intermediate molded article 30 to close contact to the cavity surfaces 304A and 306A, and be shaped corresponding to the final blow-molded article 40. The final blow molding time (e.g., about 15 to 30 seconds) is longer than the blow molding time employed in the heat treatment section 200. The final blow molding pressure may be the same as the secondary blow molding pressure, or may be higher than the secondary blow molding pressure in order to sufficiently shape the intermediate molded article 30.

Since the intermediate molded article 30 is maintained at a relatively high temperature, and the stretch ratio required for final shaping is small, it is considered that a strain occurs in the final blow-molded article 40 to only a small extent during final blow molding. However, since a strain may also occur in the final blow-molded article 40 due to stretching during final blow molding, a heating section is also provided in the final blow molding section 300.

Figure 10:
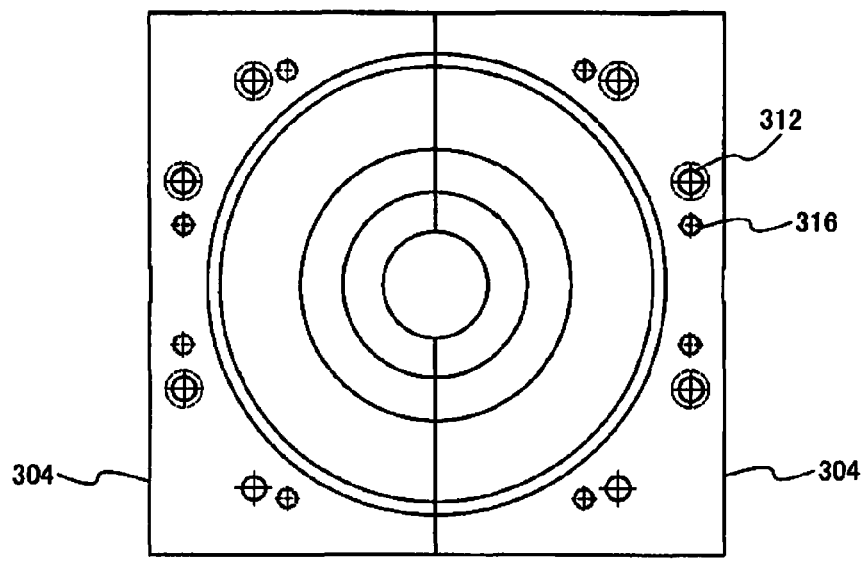
FIG. 10 is a plan view showing a pair of final blow split molds.
Figure 11:
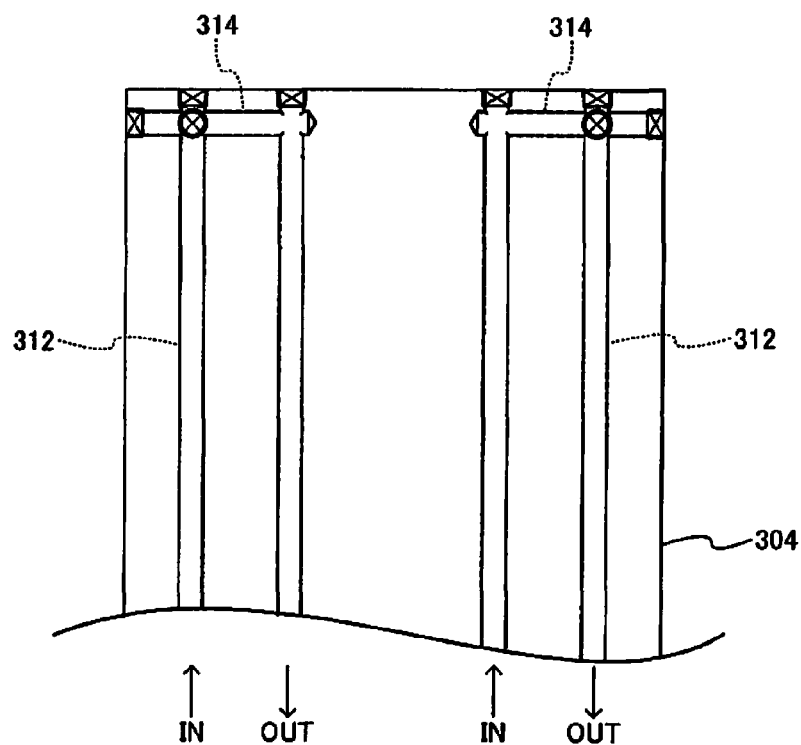
FIG. 11 is a schematic view showing a longitudinal hole and a transversal hole (heating medium passages) formed in a pair of final blow split molds.

As shown in FIGS. 9 to 11, four longitudinal holes 312 are formed through each of the pair of final blow split molds 304 included in the final blow molding section 300 at equal intervals in the circumferential direction (eight longitudinal holes 312 are formed in total). As shown in FIG. 11, each of the pair of final blow split molds 304 is configured so that each pair of longitudinal holes 312 is closed at one end (e.g., upper end), and connected through a bottomed transversal hole 314. For example, a heating medium is supplied through the lower end of the leftmost longitudinal hole 312 in FIG. 11, and flows into the adjacent longitudinal hole 312 through the transversal hole 314. The lower end of the longitudinal hole 312 into which the heating medium has flowed is connected to another adjacent longitudinal hole 312 via a mold attachment plate (not shown). Specifically, each of the pair of final blow split molds 304 is configured so that the four longitudinal holes 312 and the two transversal holes 314 communicate to form a heating medium passage. The pair of final blow split molds 304 can be heated by circulating the heating medium through the heating medium passage.

As shown in FIGS. 9 and 10, a bottomed longitudinal hole 316 (eight longitudinal holes 316 in total) for disposing a thermocouple is formed near each longitudinal hole 312. The heating temperature of the body 44 of the final blow-molded article 40 can be controlled by disposing a thermometric element such as a thermocouple 318 (see FIG. 9) in each longitudinal hole 316, and feeding back the measured temperature.

Since the pair of final blow split molds 304 is not used to remove a strain due to over-stretching (over-drawing), the heating temperature may be lower than the heating temperature employed in the heat treatment section 200. For example, the heating temperature may be set to 80 to 110° C. It suffices that the heating temperature be higher than the washing temperature (e.g., 60 to 70° C.) of the final blow-molded article (large returnable container) 40, and may be 100° C. or less.

When discharging air from the final blow-molded article 40, removing the final blow-molded article 40, and allowing the final blow-molded article 40 to stand for 40 hours, the final blow-molded article 40 did not show a change in total height and volume (capacity). The air discharge speed of the final blow molding section 300 may be sufficiently lower than that of the heat treatment section 200. When transferring the primary blow-molded article 20 to the heat treatment section 200 in an inverted state, the intermediate molded article 30 is also transferred to the final blow molding section 300 in an inverted state. In this case, the transfer mechanism shown in FIG. 7 is used for the final blow molding section 300. Note that the seal cancelation operation of the seal piston 72 is performed at a low speed.

3. Second Embodiment

Figure 12:
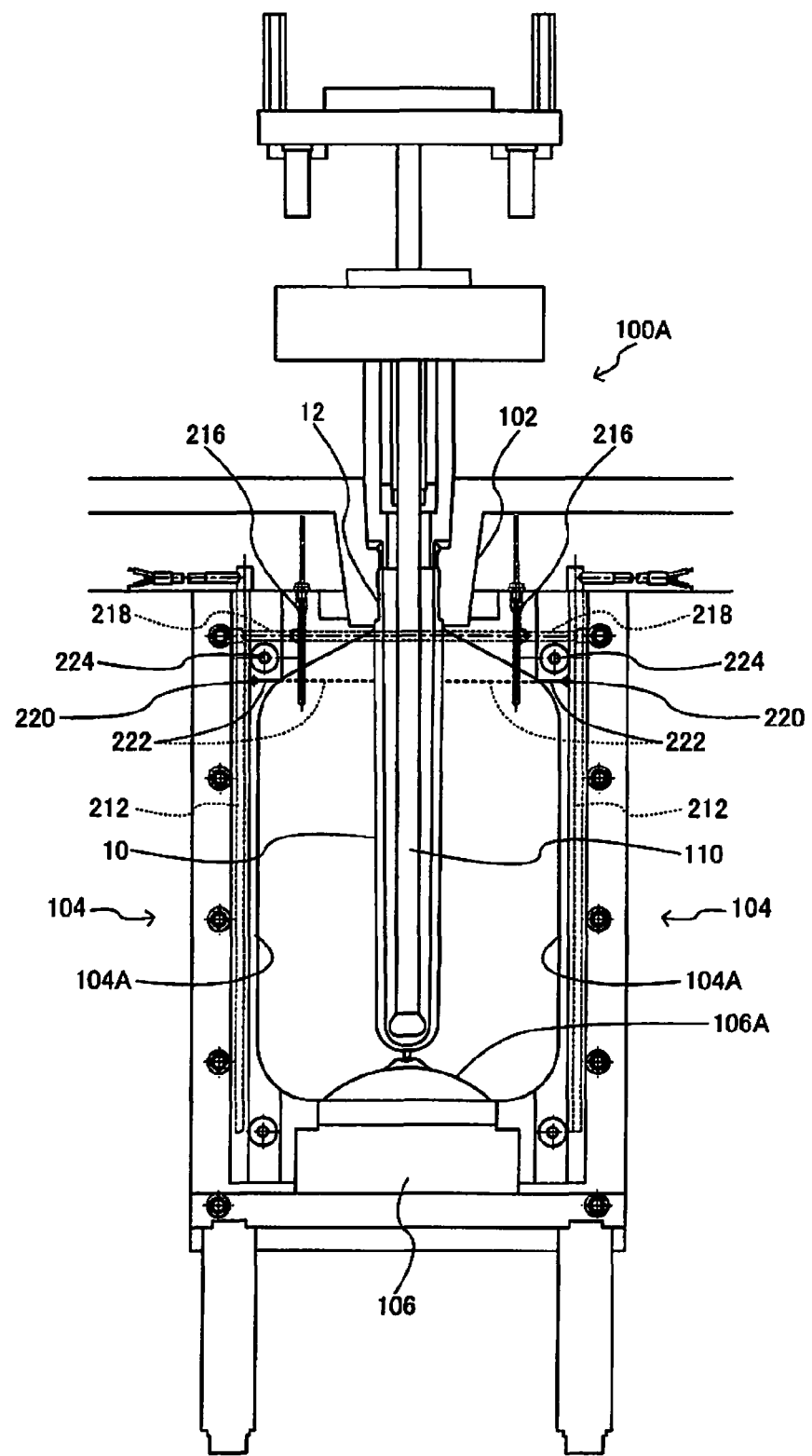
FIG. 12 is a schematic cross-sectional view showing a primary blow molding section having a heat-setting function according to another embodiment of the invention.

In the second embodiment, a primary blow molding section (heat treatment section) 100A shown in FIG. 12 is provided instead of the primary blow molding section 100 shown in FIG. 3 and the heat treatment section 200 shown in FIG. 4. The primary blow molding section (heat treatment section) 100A shown in FIG. 12 includes elements 212 to 224 for the heating section shown in FIGS. 4 to 6 in addition to the elements of the primary blow molding section 100 shown in FIG. 3.

Specifically, the primary blow molding section 100A blow-molds the preform 10 to form the primary blow-molded article 20 while heat-setting the shoulder 22 and the body 24 of the primary blow-molded article 20 through a cavity surface 102A. In this case, the shoulder zone and the body zone are insulated by air in the same manner as in the heat treatment section 200 according to the first embodiment, and the shoulder is heated at a low heating temperature as compared with the body.

According to this configuration, the body that has been stretched at a high stretch ratio is simultaneously heat-set at a high temperature, so that the strain that has occurred during primary blow molding is removed. Moreover, a strain can be removed from the thick shoulder that has been stretched at a relatively small stretch ratio by heating the shoulder at a low temperature, and whitening due to spherulitic crystallization can be prevented.

The intermediate molded article 30 having a size smaller than that of the final blow-molded article 40 is formed by discharging air from the primary blow-molded article using the primary blow molding section (heat treatment section) 100A shown in FIG. 12. The bottom 26 of the primary blow-molded article 20 is hot immediately after primary blow molding. It is preferable to discharge air from the primary blow-molded article 20 at a high air discharge speed so that a turnover of the bottom 26 does not occur. The intermediate molded article 30 is subjected to final blow molding using the final blow molding section 300 shown in FIG. 9 to obtain the final blow-molded article 40. The final blow-molded article 40 obtained according to the second embodiment also exhibits heat resistance and transparency in a well-balanced manner.

The second embodiment may be implemented by supplying a preform to a blow molding apparatus that includes the primary blow molding section 100A and the final blow molding section 300 from an existing preform injection molding apparatus. Alternatively, the second embodiment may be implemented using an injection stretch blow molding apparatus that includes the preform injection molding section 52, the temperature control section 53, the primary blow molding section 100A, and the final blow molding section 300 on the machine bed.

The second embodiment differs from the first embodiment in that the primary blow molding step and the heat treatment step are performed using a single mold. Therefore, the temperature of the resin that forms the primary blow-molded article 20 is higher than that of the first embodiment due to the residual heat of the preform 10. Accordingly, a container that differs from that obtained according to the first embodiment as to the thickness adjustment, molding stability, and the like can be molded.

According to the second embodiment, the shoulder 22 and the bottom 26 of the primary blow-molded article 20 are easily stretched due to retaining high heat as compared with secondary blow molding according to the first embodiment. Since the shoulder 22 and the bottom 26 of the primary blow-molded article 20 are easily stretched, the body 24 is not stretched excessively. Therefore, the thickness of the primary blow-molded article 20 during the heat treatment according to the second embodiment differs from the thickness of the secondary blow-molded article 30 during the heat treatment according to the first embodiment, so that heat resistance and transparency are different between the first and second embodiments.

Since the primary blow-molded article 20 according to the second embodiment possesses still high heat when the resin has come in contact with the cavity surface 106A, the resin easily moves on the cavity surface. Therefore, the first embodiment ensures that the primary blow-molded article exhibits more excellent molding stability as compared with the second embodiment.

Since the second embodiment utilizes two blow molds (i.e., the primary blow mold and the final blow mold that serve as the heat treatment mold) (i.e., the number of blow molds can be reduced by one as compared with the first embodiment), the size of the apparatus can be reduced.

The user can selectively use the first embodiment or the second embodiment depending on whether the user regard heat resistance or transparency as important, and whether or not the user allows an increase in the size of the apparatus.

Although only some embodiments of the invention have been described in detail above, those skilled in the art would readily appreciate that many modifications are possible in the embodiments without materially departing from the novel teachings and advantages of the invention. Accordingly, such modifications are intended to be included within the scope of the invention. Any term cited with a different term having a broader meaning or the same meaning at least once in the specification and the drawings can be replaced by the different term in any place in the specification and the drawings.

In the above embodiments, a heating section is not provided in the secondary bottom mold 206 shown in FIG. 4 and the primary bottom mold 106 shown in FIG. 12. Since the bottom 26 of the primary blow-molded article 20 also has a large thickness, the bottom 26 may be heated at a low temperature as compared with the body 24 in the same manner as the shoulder 26. This makes it possible to reduce or prevent whitening of the bottom 36 of the intermediate molded article 30 due to spherulitic crystallization.

The heating section provided in the heat treatment sections 100A and 200 and the final blow molding section 300 may be implemented by various means that can heat the molded article in the blow mold instead of the rod-like heater and the heating medium passage.

Although only some embodiments of the invention have been described in detail above, those skilled in the art would readily appreciate that many modifications are possible in the embodiments without materially departing from the novel teachings and advantages of the invention. Accordingly, such modifications are intended to be included within the scope of the invention.

What is claimed is:

1. A method of molding a large returnable container comprising:

a heat treatment step that includes intermediate blow molding a preform that has a thick wall and that is formed of a polyester resin, or a primary blow-molded article obtained by subjecting the preform to primary blow molding, into an intermediate molded article from which a strain that has occurred during blow molding has been removed in a heat treatment mold; and a final blow molding step that includes subjecting the intermediate molded article that has shrunk to final blow molding with heating to obtain the large returnable container, wherein the heat treatment mold includes a pair of split molds, each of the pair of split molds includes a cavity surface, a parting surface that is continuous with the cavity surface, and a slit that becomes exposed at the cavity surface so as not to reach the parting surface, and wherein the heat treatment step includes disposing the preform or the primary blow-molded article in the heat treatment mold, and pressurizing the preform or the primary blow-molded article by introducing high-pressure air into the preform or the primary blow-molded article so that a shoulder and a body that have been formed by blow molding closely contacts the cavity surface, and are subjected to a heat treatment by contact with the cavity surface, the shoulder being heated at a low temperature as compared with the body while separating heating zones that respectively correspond to the shoulder and the body by an air insulation layer formed by the slit.

2. A method of molding a large returnable container comprising:
- a heat treatment step that includes intermediate blow molding a primary blow-molded article obtained by subjecting a preform to primary blow molding into an intermediate molded article in a heat treatment mold, the preform having a thick wall and formed of a polyester resin, the primary blow-molded article having been stretch-oriented and including a shoulder and a body, and a strain that has occurred during the primary blow molding having been removed from the intermediate molded article; and
- a final blow molding step that includes subjecting the intermediate molded article that has shrunk to final blow molding with heating to obtain the large returnable container,
- wherein the heat treatment mold includes a pair of split molds, each of the pair of split molds includes a cavity surface, a parting surface that is continuous with the cavity surface, and a slit that becomes exposed at the cavity surface so as not to reach the parting surface, and
- wherein the heat treatment step includes disposing the shoulder and the body of the primary blow-molded article in the heat treatment mold, and pressurizing the primary blow-molded article by introducing high-pressure air into the primary blow-molded article so that the primary blow-molded article closely contacts the cavity surface, and is subjected to a heat treatment by contact with the cavity surface, the cavity surface having a shape substantially identical with those of the shoulder and the body of the primary blow-molded article, and the shoulder of the primary blow-molded article being heated at a low temperature as compared with the body of the primary blow-molded article while separating heating zones that respectively correspond to the shoulder and the body by an air insulation layer formed by the slit.

3. The method according to claim 2, further comprising:
- a first air discharge step that includes discharging air from the intermediate molded article after the heat treatment step; and
- a second air discharge step that includes discharging air from the large returnable container after the final blow molding step,
- an air discharge speed in the first air discharge step being higher than an air discharge speed in the second air discharge step.

4. The method according to claim 2, wherein
- the heat treatment mold further includes a bottom mold that comes in contact with a bottom of the primary blow-molded article, the bottom of the primary blow-molded article being raised and closing one end of the body of the primary blow-molded article, and
- the heat treatment step includes clamping the bottom mold before clamping the pair of split molds, and centering the primary blow-molded article using the bottom mold.

5. The method according to claim 1, wherein
- the preform includes sufficient material to form the large returnable container, and
- the heat treatment mold used to perform the heat treatment step includes a first temperature control section that heats the body of the primary blow-molded article, and a second temperature control section that heats the shoulder of the primary blow-molded article, wherein the body of the primary blow-molded article is heated to a first temperature and the shoulder of the primary blow-molded article is heated to a second temperature, the first temperature being higher than the second temperature.

6. The method according to claim 5, wherein the first temperature is between 140 and 180 degrees Centigrade, and the second temperature is between 100 and 120 degrees Centigrade.

7. The method according to claim 5, wherein the body of the primary blow-molded article is heated by a first heating section that extends along the length of the body of the primary blow-molded article, and the shoulder of the primary blow-molded article is heated by a second heating section that surrounds and is disposed at the height of the shoulder of the primary blow-molded article.

8. The method according to claim 1, wherein the large returnable container has a capacity between three and six gallons.

9. The method according to claim 1, wherein the thick wall of the preform is at least twice as thick as a thin preform configured to form a small container having a volume of up to two liters.

10. The method of claim 1, wherein
- the heat treatment step is performed using a heat treatment section that subjects the primary blow-molded article obtained by subjecting a preform having the thick wall to primary blow molding to secondary blow molding with heating to obtain the intermediate molded article, the preform being formed of a polyester resin and including a neck, the primary blow-molded article having been stretch-oriented and including a shoulder and a body, and a strain that has occurred during the primary blow molding having been removed from the intermediate molded article, and
- the final blow molding step is performed using a final blow molding section that subjects the intermediate molded article that has shrunk to final blow molding with heating to obtain a large returnable container, a strain that has occurred during the final blow molding having been removed from the large returnable container,
- wherein the heat treatment section includes the heat treatment mold that includes a pair of split molds, and has the cavity surface, the cavity surface having a shape substantially identical with those of the shoulder and the body of the primary blow-molded article, and the heat treatment section further includes an air input member that is disposed in the neck of the primary blow-molded article, and pressurizes the primary blow-molded article by introducing high-pressure air into the primary blow-molded article,
- wherein each of the pair of split molds included in the heat treatment mold includes the parting surface that is continuous with the cavity surface, and the slit that becomes exposed at the cavity surface so as not to reach the parting surface, and
- wherein an air insulation formed in the slit insulates and separates heating zones that respectively correspond to the shoulder and the body of the intermediate molded article and heats the shoulder at a low temperature as compared with the body.

11. The method of claim 10, further comprising:
- using a transfer member that includes the air input member, transferring the primary blow-molded article in an inverted state in which the neck is positioned at a lower end; and
- using a seal piston that is provided in the heat treatment section, and is drivable to come in contact with or be removed from the transfer member, sealing the transfer member when the seal piston has come in contact with the transfer member so that the high-pressure air is supplied to the air input member, and wherein the transfer member is unsealed when the seal piston has been removed from the transfer member so that air is discharged from the intermediate molded article.

12. The method of claim 1, wherein the heat treatment step is performed using a blow mold comprising
the pair of split molds that respectively includes the cavity surface, and the parting surface that is continuous with the cavity surface, the parting surfaces coming in contact with each other when the pair of split molds are clamped, each of the pair of split molds including
the slit that becomes exposed at the cavity surface so as not to reach the parting surface,
a first temperature control section that is disposed in one of the zones divided by the slit, and
a second temperature control section that is disposed in the other of the zones divided by the slit, and is adjusted to a temperature differing from that of the first temperature control section.

13. The method of claim 12, wherein
each of the pair of split molds includes a hole formed therein and into which a wire for forming the slit by a wire cutting operation is inserted, and wherein the slit communicates with the hole.

14. A method of molding a large returnable container comprising:
providing an initial article comprising one of a preform and a primary blow-molded article;
a heat treatment step that includes blow molding the initial article into an intermediate molded article;
allowing the intermediate molded article to shrink; and
a final blow molding step that includes subjecting the intermediate molded article that has shrunk to final blow molding with heating to obtain the large returnable container,
wherein the heat treatment mold includes a pair of molds, each of the pair of molds including a cavity surface, a parting surface that is continuous with the cavity surface, and a recess formed in each mold that extends through the cavity surface but not through the parting surface, and
wherein the heat treatment step includes disposing the initial article in the heat treatment mold, pressurizing the initial article so that a shoulder and a body that have been formed by blow molding are abutted against and conformed to the cavity surface, insulating first and second heating zones that correspond to the shoulder and the body, respectively, using an air insulation layer disposed within the recess between the first and second heating zones, and using the air insulation layer, heating the first and second zones to different temperatures and heat treating the initial article via conductive heating from the cavity surface of each of the molds such that the shoulder is heated at a lower temperature at the first heating zone than the body at the second heating zone.

* * * * *